(12) United States Patent
Rayat

(10) Patent No.: US 11,556,993 B2
(45) Date of Patent: *Jan. 17, 2023

(54) METHODS AND SYSTEMS FOR A GAMIFIED STARTUP ECOSYSTEM

(71) Applicant: Sarbjeet S. Rayat, Norwalk, CT (US)

(72) Inventor: Sarbjeet S. Rayat, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,406

(22) Filed: Jan. 18, 2021

(65) Prior Publication Data

US 2021/0142415 A1    May 13, 2021

Related U.S. Application Data

(63) Continuation-in-part of application No. 16/453,591, filed on Jun. 26, 2019, now Pat. No. 10,930,173.

(60) Provisional application No. 62/690,121, filed on Jun. 26, 2018.

(51) Int. Cl.
| | |
|---|---|
| *G06Q 40/06* | (2012.01) |
| *A63F 13/57* | (2014.01) |
| *A63F 13/46* | (2014.01) |
| *A63F 13/69* | (2014.01) |
| *H04L 65/65* | (2022.01) |

(52) U.S. Cl.
CPC ............. *G06Q 40/06* (2013.01); *A63F 13/46* (2014.09); *A63F 13/57* (2014.09); *A63F 13/69* (2014.09); *H04L 65/65* (2022.05)

(58) Field of Classification Search
CPC .......... A63F 2300/575; G07F 17/3255; G06Q 40/06; G09B 19/18
See application file for complete search history.

(56) References Cited

U.S. PATENT DOCUMENTS

| | | | | |
|---|---|---|---|---|
| 2007/0129125 | A1* | 6/2007 | Van Luchene | G06Q 40/00 705/35 |
| 2008/0207333 | A1* | 8/2008 | Johnson | A63F 13/00 463/42 |
| 2009/0259537 | A1* | 10/2009 | Veksler | G06Q 20/308 705/40 |
| 2011/0229860 | A1* | 9/2011 | Leventhal | G09B 19/00 434/107 |
| 2013/0231189 | A1* | 9/2013 | Beeler | A63F 13/35 463/42 |
| 2017/0113144 | A1* | 4/2017 | McDonald | G06Q 50/00 |

* cited by examiner

*Primary Examiner* — Malina D. Blaise
(74) *Attorney, Agent, or Firm* — RC Trademark Company

(57) ABSTRACT

Systems and methods are presented to disclose a gamified startup ecosystem wherein the participants comprising various real and role-playing stakeholders of the startup ecosystem are enabled and incentivized to interact with each other in their respective roles in a plurality of ways that draw upon gamification to make the participants' experiences interactive, valuable, interesting, educational, and rewarding for them in their various roles.

18 Claims, 5 Drawing Sheets

METHODS AND SYSTEMS FOR A GAMIFIED STARTUP ECOSYSTEM

CROSS REFERENCE TO RELATED APPLICATIONS

The following application is a continuation-in part of U.S. patent application Ser. No. 16/453,591, which claims priority to U.S. Provisional Application 62/690,121 filed Jun. 26, 2018, both of which are hereby incorporated by reference in their entirety and made a part hereof.

BACKGROUND

When taking their innovations to the market, entrepreneurs experience many struggles, with one of them being lack of resources to develop their products, test their ideas, find product-market fit, promote their products, and fundraise. To carry out these activities, they seek to raise capital, which is difficult to access for most startups. On the other side of the table, there's an increasing excitement among retail investors to participate in the investment process in startups and reap the upside when the startups go public. However, investing in startups is a high risk investment. With regulations now allowing even unaccredited investors to invest in startups, there's been an increase in crowdfunding activity with more crowd investors and more deals getting funded on crowdfunding platforms. Research shows that almost ninety percent of startups fail and, resultantly, most of these investments are also likely to fail.

Learning how to attract investors for a startup business may be a daunting and intimidating task that may only be learned through experience. Learning how to invest in startups can also be a high risk activity that may be better for aspiring investors to learn or become acquainted with before investing than after having invested and probably lost their hard earned money. It would therefore be desirable to provide a game-like simulated environment in which aspiring entrepreneurs can gain experience in how to attract investors for a startup business, and aspiring investors gain experience in evaluating new ideas, evaluating new ventures and evaluating the risks involved in investing in new ventures.

SUMMARY OF THE INVENTION

One way to solve these problems in the startup ecosystem is to enable and incentivize the crowd to engage with startups in ways that creates value for startups and entrepreneurs, and makes the engagement fun and exciting for the crowd while rewarding them for their engagement and educating them about investments and entrepreneurship. While fundraising on the part of startups and investing on the part of investors are critical activities in the innovation space, there are several other forms of engagement between various stakeholders of the ecosystem that happen over the course of a startup's journey from inception to IPO. This invention draws on gamification principles to design systems and methods that enable and incentivize engagement amongst various real and role-playing stakeholders that include but are not limited to entrepreneurs, startups, founders, investors, funds, investment firms, accelerators, incubators, students, professors, professionals and service providers such as lawyers, accountants, developers, graphic designers, and marketing consultants. In this invention, various forms of engagement are incentivized by varying rewards to create varying levels of value for various stakeholders.

DETAILED DESCRIPTION

Figure 1:
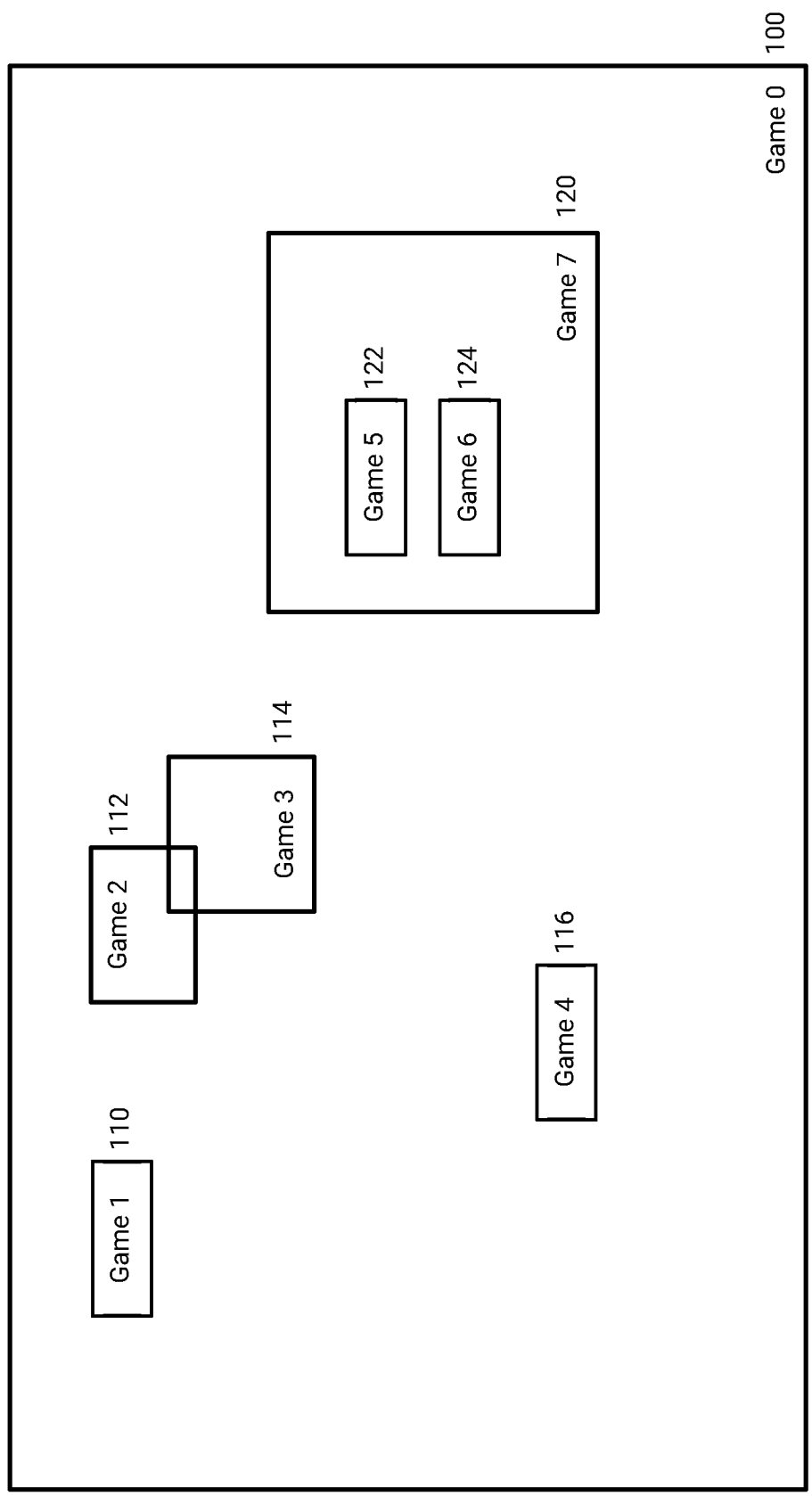
FIG. 1 illustrates the relationship between various games within the gamified startup ecosystem

The word "exemplary" is used herein to mean "serving as an example, instance, or illustration." Any embodiment described herein as "exemplary" is not necessarily to be construed as preferred or advantageous over other embodiments.

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art. The term "and/or" includes a plurality of combinations of relevant items or any one item among a plurality of relevant items. When the word "or" is used in reference to a list of two or more items, that word covers all of the following interpretations of the word: any of the items in the list, all of the items in the list and any combination of the items in the list. The term "at least" preceding a listing of items denotes one or any combination of the items in the listing.

As used herein, the terms "comprises," "comprising," "includes," "including," "has," "such as", "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

In the present disclosure, the term gamified startup ecosystem (GSE) is used to mean a network or an interconnected system that enables and incentivizes interactions among individuals, groups, organizations and other entities to create and scale new startup companies, and wherein the processes and outcomes may occur entirely or partially in a game-like environment that draws on gamification principles. The GSE encompasses various systems, modules, methods, programs, units, devices, policies and processes that enable and incentivize one or more participants to interact with one or more of other participants wherein the participants may be real or role-playing stakeholders in the startup ecosystem or in environments creating new ideas, products and services, projects, scripts that may occur within an organization or a field.

In this invention, a pitch is defined as a description of one or more ideas for a product, service, business or a project, or description of the actual products, services, businesses, projects in various multimedia formats including but not limited to text, images, audio, video, pitch decks, presentation slides, brochures, and poster boards and which is often to try to persuade someone to buy or accept something. The description may include one or more of the following that include but are not limited to the problem being attempted to be solved, the importance of solving that problem, at least one proposed solution, how different that proposed solution is from existing solutions, market size of the opportunity, team, funding or resources required, challenges anticipated, intellectual property acquired or pending IP applications, product roadmap, project timeline, revenue model, and go-to-market strategy. A pitch may have an end-point in time, for example, a five-minute presentation, or it may have an end-point in space/matter, such as a 3-page document that can be accessed anytime over a period of time or a combination of both such as a 10-slides pitch deck presented in 5-minutes. In one embodiment, the pitch has a dynamic nature in the sense that it can change over time whereas in another embodiment, the pitch is static and cannot change once it is presented in the GSE. In any of the above described forms, if available, a pitch can be accessed anytime such as a recorded video or a document. Depending on the permissions set by the administrator of the GSE, or the author of the pitch or a participant with administrator rights to the pitch, the pitch can be accessed by anyone within or outside the GSE, by a select group of participants who meet the specified requirements of the game, or participants authorized by the author/administrator or the GSE.

Pitch events are venues where ideas or products/services are pitched to audiences usually comprising entrepreneurs, experts, investors, customers, service providers, and others with a general interest in such events. Pitch events find applications in various fields such as pitching ideas for ventures (startups), ideas and/or scripts for movies or shows, business plan presentations and intra- and inter-collegiate business plan/new-venture competitions, and intra-organizational ideas for new products/projects and/or innovations to existing products/projects. The invention disclosed in the present disclosure finds applications in all of these above listed areas and wherever there are one or more entities including but not limited to ideas, proposals, products, projects, teams, that are listed or presented to an audience that invests virtual money in the entities being pitched, and where the popularity of and support for entities are determined by which entity received the most investment, and winners amongst the audience are determined by a function of one or more of including but not limited to how the entities they invested in performed at the contest and/or how the individual audience members invested compared to others in one or more categories of the audience. Business plan competitions are a form of pitch events usually conducted at educational institutions.

A game participant device is defined as any device that the participant uses to participate in any part of the game on the GSE that may include one-way communication (send or receive) or two-way communication (send and receive) for any part of one or more games. For example, game participants devices include mobile phones, laptops, tablets, computers that may have a two-way communication, including TV that may only receive communication, and Smart TV that may have a two-way communication, a gaming console, a portable gaming device, glasses based computing device, an Augmented Reality (AR) device or helmet or glasses, a Virtual Reality (VR) device or helmet or glasses, and a smart-watch device. The GSE may be configured to operate with any communication medium that can deliver and/or receive content.

Virtual money is defined as unregulated digital money (that is, not regulated by law) which is not a legal tender and is issued and controlled by developers and administrators of the GSE, and which may be used and accepted among participants of the GSE. It may be possible to buy virtual money with real money. The definition of virtual money also encompasses virtual credits, points, and tokens that can be used in place of virtual money, whereupon the game system may then operate using only one selected method of virtual credits, coins, tokens, or points, or may operate in a hybrid manner, for example, using both virtual credits and virtual tokens where each can be converted into the other in some multiple. An example of this hybrid use could be a game in which the game participants receive virtual credits for some actions and receive virtual money for other actions, wherein the virtual credits could be redeemed for virtual money. For the sake of simplicity in describing the invention, the term virtual money will be used throughout the rest of the disclosure but it is to be understood that virtual money can be replaced throughout the description with any other term listed above in a manner and form suitable for its application within the GSE.

An exchange matches people who want to buy and sell something for something else. Within the GSE, a first participant (for example, playing the role of an investor) who has a stake in a second participant (for example, playing the role of a startup or a Fund) lists the price they are willing to sell that stake by placing a sell order. If there is a buy order at the same price from a third participant (for example, playing the role of an investor or a Fund), then the exchange matches these two orders, a trade happens between the first and the third participant and the stake and currency units change hands. This is now the Last Traded Price. When the next participant places an order, the exchange again checks if there is a matching buy or sell order on the other side, thus the last traded price changes with each successive trade. If there isn't an order at the same or better price, then this order stays open, until a future order matches against it or is canceled by the person who placed it. The exchange as used in this invention incorporates in its entirety the mechanics of how the stock market such as NYSE or NASDAQ operates. In addition, the invention adds features that are not present in the current stock market, for example, directly trading one's investment in an entity with another participant without the role of or exchange of shares issued by that entity.

Game participants can be an individual, or a group of individuals or an artificial entity such as an organization or a city Within the gamified startup ecosystem, a game participant can play various roles including but not limited to an investor, a startup, a Fund, a service provider, mentor or host of an event. In this disclosure, wherever the role is used, it is to be understood that it refers to a game participant playing that role. For example, where the description states an investor investing virtual money in a startup, it refers to a first game participant playing the role of an investor investing virtual money in another game participant playing the role of a startup.

A game participant playing the role of investor can receive virtual money in a plurality of ways including but not limited to buying it with real money, receiving virtual money upon joining a pitch competition, upon rating another participant's pitch, upon creating a new account, by referring new users to the gamified startup ecosystem, earning gains via profitable return on investments in other participants such as startups and Funds, upon his or her investments or stakes in a second participant getting acquired by a third participant such as a Fund, from other participants such as from startups for helping them with activities such as promoting their products/services in the social media, and completing a poll or survey for the startups. The game participants can spend the virtual money in a number of ways including but not limited to investing in startups, paying for account maintenance fees, buying hints, and accessing premium content and features on the gamified startup ecosystem. They can lose part of or all their virtual money for reasons including but not limited to losses in their investments in startups or Funds, and activity/inactivity fees for using the gamified startup ecosystem.

A game participant playing the role of a startup can receive virtual money in a plurality of ways including but not limited to buying it with real money, from other participants playing the role of investors and Funds, and on reaching certain milestones such as acquiring 10,000 investors. They can then spend the virtual money on rewarding participants for activities such as including but not limited to completing a poll/survey for the startups, promoting the startup's products and services, and referral fees for bringing in more investors to their startup. Similarly, participants in other roles such as Fund or Host can also receive and spend virtual money in multiple ways on the gamified startup ecosystem.

In some embodiments, the virtual money that game participants receive from one or multiple sources may become available to them only after they meet one or more requirements specified in the gamified startup ecosystem. For example, the virtual money invested in a startup may become available to the investor only after the startup gets listed on an exchange in the GSE or has pitched a minimum number of times in the GSE; and in the case of startups, the virtual money may become available to the startup only after it has acquired a minimum number of investors or raised a minimum amount of virtual money, or becomes a paid user, or met other criteria specified by a GSE administrator.

Figure 4:
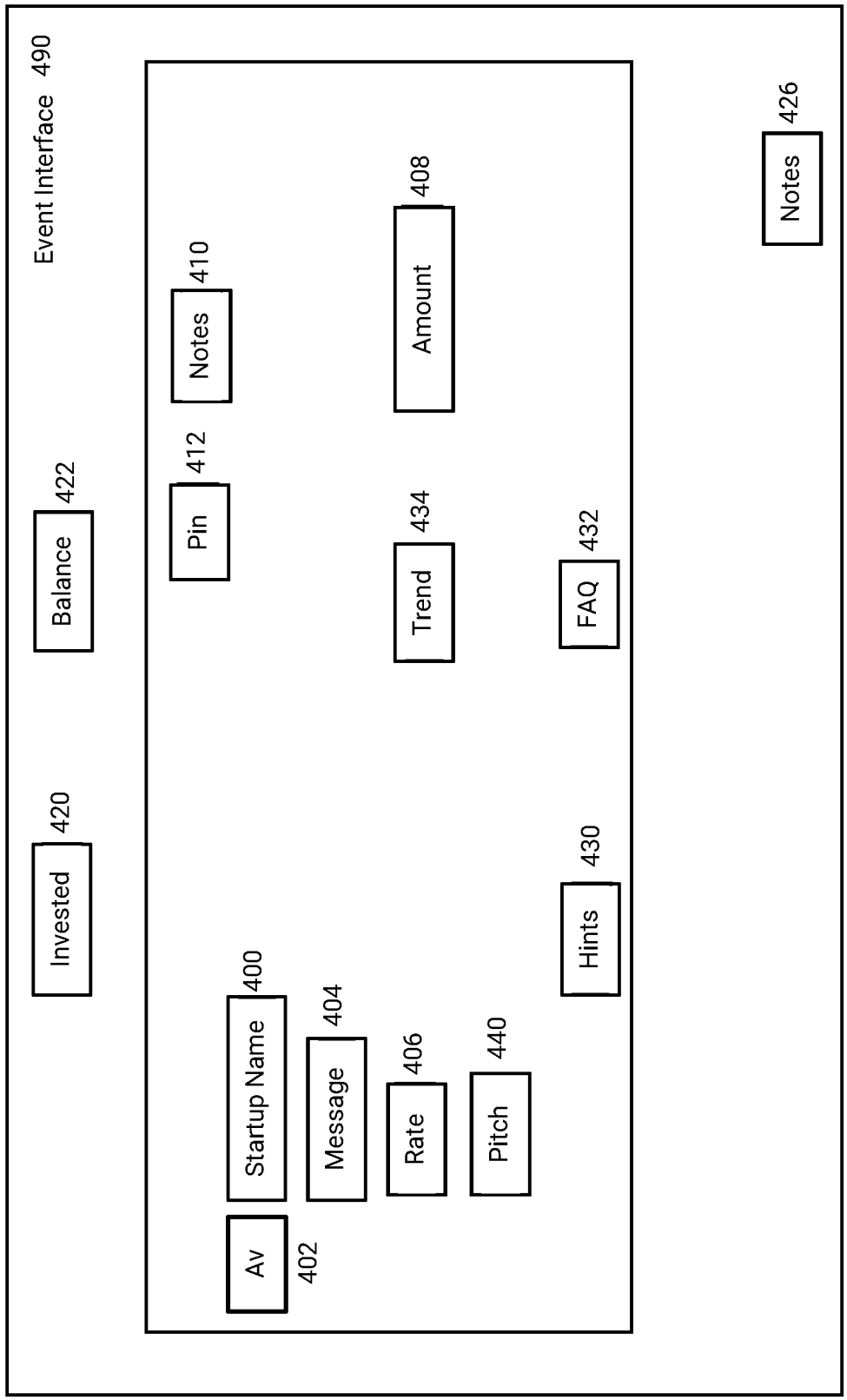
FIG. 4 illustrates an embodiment of the interface of the investment module used for pitch events

In one embodiment, participants use an interface illustrated in FIG. 4 to participate in a pitch event. Startups participating in the event are listed on the screen. FIG. 4 shows one startup displayed with its name 400 and an avatar 402 wherein each may be a link to the startup's profile on the GSE. A participant can invest an amount 408 of virtual money that the participant can change later. Also displayed is the total amount of virtual money invested 420 and the balance available 422 at that point. The participant can rate 404 the startup's pitch which may open up a rating screen or it may be a thumbs up and down type of rating that may be recorded on the same screen by clicking or tapping that button or it may be a drop down type of field that provides the rating choices. The rating may take various forms such as a numerical scale on values such as from 1 to 5, or a binary such as red or green, agree or disagree, go or no-go, and up or down. The participant can also take notes that may be specific to a startup, such as in 410, or the notes may be specific to an overall event, such as in 426. The participant can interact with the startups in real time via a message feature 404 for asking questions, giving feedback, or simply connecting for networking. Users can pin 412 startups of their interest, whereupon the pinned startups are displayed at specific places in the system including but not limited to the top of the list, bottom of the list, on a different screen or page, and in their profiles. In some embodiments, the trend 434 of how participants are investing in a startup may be displayed for that startup. The trend for that startup may be specific to an event in progress or the trend may be for over a period of time such as over the previous week or month. The participant can also view frequently asked questions, FAQ 434 for a startup 400 that the startup may have completed. In some embodiments, participants can access the startup's pitch 440 that may be available in one or more formats described earlier in the disclosure, for example, which may play a pre-recorded video/audio or open up a pitch deck such as in powerpoint or pdf or a brochure. The pitch may be uploaded and stored within the gamified startup ecosystem or it may be accessed via a link to a source located outside the system. The user experience may be gamified and interactive throughout. For example, pre-investors will receive a warning/alert when they are investing all or most of their allowed premoney in one startup indicating a high risk. They may also buy hints 430 with virtual money that include but are not limited to best strategies to have high return on investment, pitfalls to avoid, and latest news on a startup that may be critical in making an investment decision.

Figure 2:
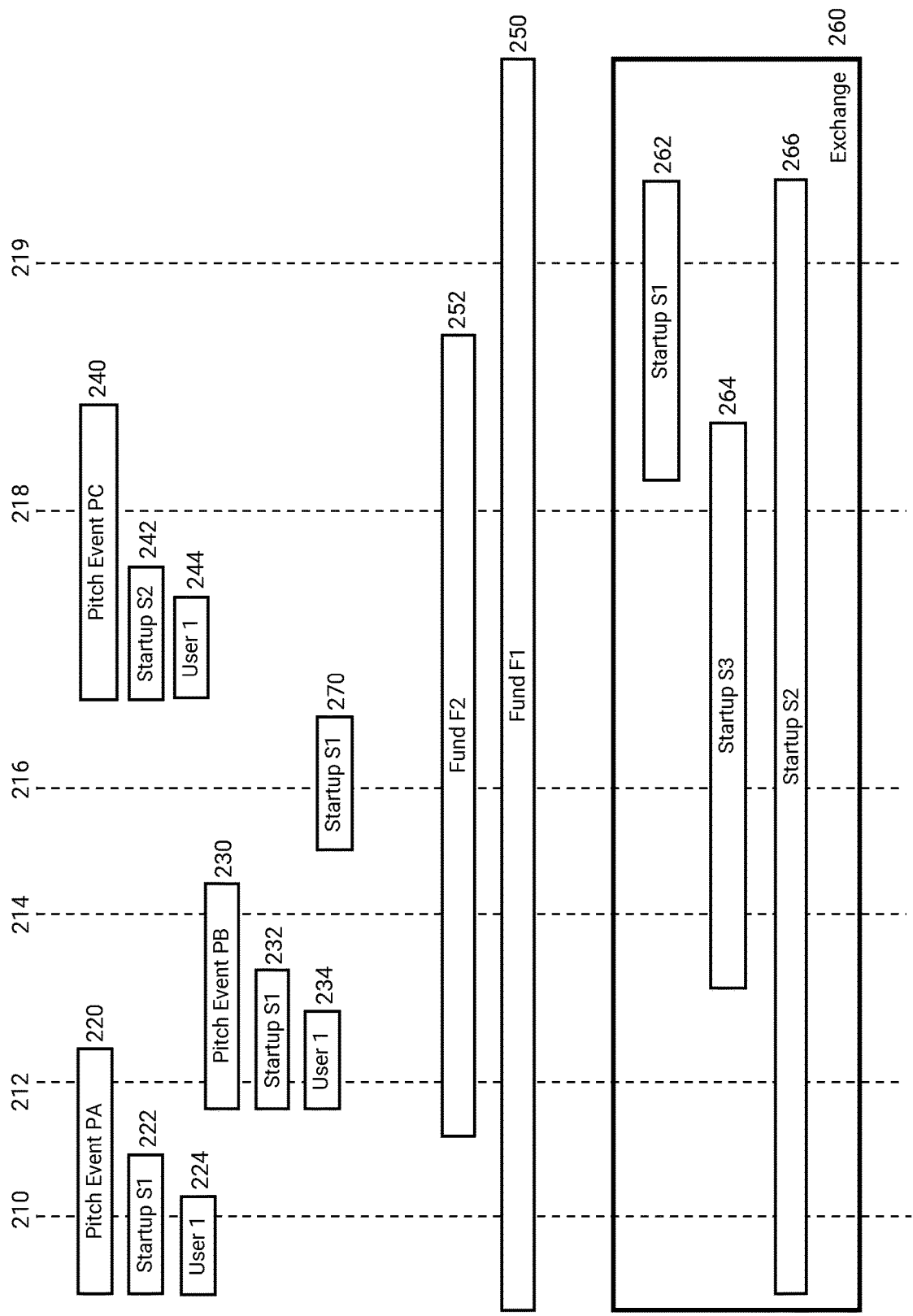
FIG. 2 illustrates the embodiments of investments in the same and different startups across different time periods

In the GSE, participants can invest in startups over a period of time, in different circumstances, and/or in different ways. FIG. 2 illustrates states at different time points, 210, 212, 214, 216, 218, 219, in increasing order where 219 is furthest along the timeline. Startup S1 is shown in four different states 222, 232, 242, 262, at different points of time. As illustrated in the figure, at a certain point of time 210, game participants can invest in startup S1 222 pitching at a pitch event PA 220. At another time 212, game participants can invest in the same startup S1 232 when it pitches at another pitch event PB 230 occurring while the earlier pitch event PA 220 is not yet over. At another time 214, game participants can invest in the same startup S1 270 on a rolling basis outside the context of a pitch event and while that startup S1 is not yet listed on an exchange 260. At another time 220, game participants can invest in the same startup S1 262 after it gets listed on an exchange and is not pitching at a pitch event. At another time 218, game participants can invest in a startup S2 242 that is pitching at a pitch event PC 240 and while that startup S2 266 is also listed on an exchange. The game participants can invest in startups in different ways on the GSE that include but are not limited to using the interface 490 in FIG. 4 for pitch events on which the startup is listed, the interface for an exchange, and using the feature provided on the startup's profile. In another embodiment, the GSE provides the ability via an API to other system providers that may be external to GSE to allow their users to invest in startups from that provider's system that includes but is not limited to website, application, software, hardware, or platform.

In one embodiment, the performance of the startups may be determined by one or more of the following that include but are not limited to the amount of virtual money they raise from one or more categories of game participants, the ratings that their pitch receives from one or more categories of participants wherein the ratings may be in various forms such as binary (for example, up or down) or non-binary (for example, on a scale of 1 to 5), and the number of participants from one or more categories who invested in the startups. In another embodiment, the performance of startups at a given point of time may be determined by taking into consideration their performance as aggregated over or individually across one or more stages till that point of time wherein the stages may be defined in various ways including but not limited to an interval of time or the amount raised by one or more startups or any other criteria set by the system administrator or the event host.

In one embodiment, the performance of participants in a non-startup role may be determined by one or more of the following that include but are not limited to the amounts of virtual money they invested in the startups and the performance of those startups, their investments compared with the collective investment of all participants, their investments compared with the collective investment of one or more categories of participants, returns on their investments in one or more categories of events, and their performance compared with the performances of other participants measured by one or more ways as set by an administrator of the GSE or the host of an event. For example, in one embodiment, the participant whose investment matches most closely with how other participants collectively invested may have the best performance as an investor. In another embodiment, the participant whose investment matches most closely with how the judges or experts collectively invested may have the best performance as an investor. In another embodiment, the performance of a participant as an investor at a given point of time may be determined by taking into consideration the participant's performance as aggregated over or individually across one or more stages till that point of time wherein the stages may be defined in various ways including but not limited to an interval of time or the amount raised by one or more startups or any other criteria set by the system administrator or the event host.

A game participant can also play the role of a Fund on the GSE A Fund has a larger pool of virtual money. A Fund may also have different subtypes of Funds with criteria and rules that may differ from the criteria applicable to other game participants playing the role of investors. The Fund may be run and managed by an individual or by a group of people in various forms such as that includes but is not limited to a team, an organization, or a city. Some actions that a Fund can perform include but are not limited to invest directly in a startup, buy virtual shares of a startup held by other game participants, directly buyout investments of other game participants in that startup without the use of virtual shares, and/or buy out other Funds. A Fund can collaborate and/or compete with both pre-investors and with other Funds for investing premoney in startups and/or acquiring virtual shares in companies. Funds can replenish their fund of virtual money by carrying out specific activities within the investing game system or purchasing more virtual money and adding it to their fund. While anyone can apply to become a Fund, the GSE may have requirements for who can qualify to be a fund. These requirements may include but are limited to past history of the user on the GSE, performance across one or more categories, experience in the real investing world, age, whether the user has a free account or a paid account, and whether the user is willing to pay a fee associated with managing the Fund. Furthermore, other game participants may also invest their virtual money in a Fund which, in turn, manages their virtual money by investing it in startups. The Fund may charge those participants a fee for managing their virtual money and may charge an additional carry fee on the profits it generates on the capital invested by the participants.

In the exemplary embodiment described above and shown in FIG. 2, a Fund F1 250 may invest directly in a startup S1 222 at time 210 when the startup is pitching at a pitch event, at time 216 when that startup S1 270 is not pitching at any pitch event and while it has not yet been listed on the exchange 260, and at time 219 when that startup S 262 is listed on the exchange 260. At different points in time including but not limited to 210, 212, 214, 216, 218, 219, the Fund F1 250 may buy all or partial stakes of one or more investors and/or other Funds in the startups that it may be interested in. One Fund F1 250 may buy out another Fund F2 252 or vice versa.

In one embodiment, game participants create different accounts for different roles. For example, a participant wanting to play the role of an investor will create an investor account and if that same participant wants to play the role of a startup, will create another account—a startup account. To switch to another role, the participant may switch to the other account or may have to sign out of one account and then sign back in to the other account. In another embodiment, the participant can create one account that provides them the ability to switch to any other role in the game environment from within that account. These roles include but are not limited to startup, investor, fund, event host, service provider, advisor, mentor, organization, and city. In one embodiment, switching the role will provide the participant with the graphical user interface and functionalities associated with that switched-to role. For example, switching the role from startup to event host will allow the participant to set up and run a pitch event on the system, and switching the role from event host to investor will allow the participant to invest virtual money in the startups and compete for prizes. These examples are for illustrative purposes only and do not exhaust all the features and functionalities under each role.

The GSE has a discussion forum or bulletin board that allows interested game participants to discuss game strategies, post questions, comments, suggestions, to discuss various parts of the innovation such as the product, services, strategies, or execution before or after they have invested in a startup. The discussion forum may be specific to a startup and/or one common across the entire system, or specific to an interest group. In the discussion forum specific to a startup, the startup may have the right to moderate the discussion by deleting comments, hiding them, and flagging them as inappropriate to report to the GSE moderators. Participants can also communicate directly with the team members or the admin of the startup and can also engage with comments of other participants by replying, sharing, liking or flagging the comments. In another embodiment, any participant can create a forum subject to the rules of the GSE.

Participants can share their investment picks with other participants. They can choose to send notifications about their new investments to one or more selected groups of users either manually or automatically based on their preference in their settings. Participants can also send notifications to other participants about events they are interested in or will be attending. Participants can also add events to their calendars. Participants can follow other game participants in their various roles. For example, a participant may follow a Host and may then receive notifications when the Host sets up a new event, or the participant may follow a Startup and may receive notifications when that startup confirms its participation in an upcoming event or when it has won a prize or has a result from an event it participated in. The notifications can be in various forms such as in-app notifications, emails or text messages on phone or other applications.

In one embodiment, participants can search for events by filters such as including but not limited to location, date, event type, industry, startup stage, and status such as ended, in-progress, or not yet started. On an event card, participants may be able to see highlights of events that have ended, wherein the highlights may include one or more startups on the startup leaderboard, one or more pre-investors on the preinvestor leaderboard, one or more ratings of one or more startups as rated by the audience and/or the judges, date of the event, and names of judges. For events that are active and/or in progress, on the event card the participants may be able to see one or more startups that will be pitching at that event, and one or more attendees/judges who may be going to the event. The event card may have buttons or links that allow users to register or join the event and/or indicate an interest in attending. Clicking on the Join button will send information about the signed in user to the organizer of the event. The event card may have different buttons for participants playing the role of investors and judges. For events that are inviting applications from startups, the startups who is signed in will be able to apply to pitch at the event by a few methods that include clicking on a button on the event card that will send the startup details to the organizers, entering a code for the startups that is published by the organizer, completing an online form with details required by the organizer, or clicking a link that will send the required information about the startup to the event organizer. Participants may be able to share the event card on social media by using the share button associated with that event card.

Figure 5:
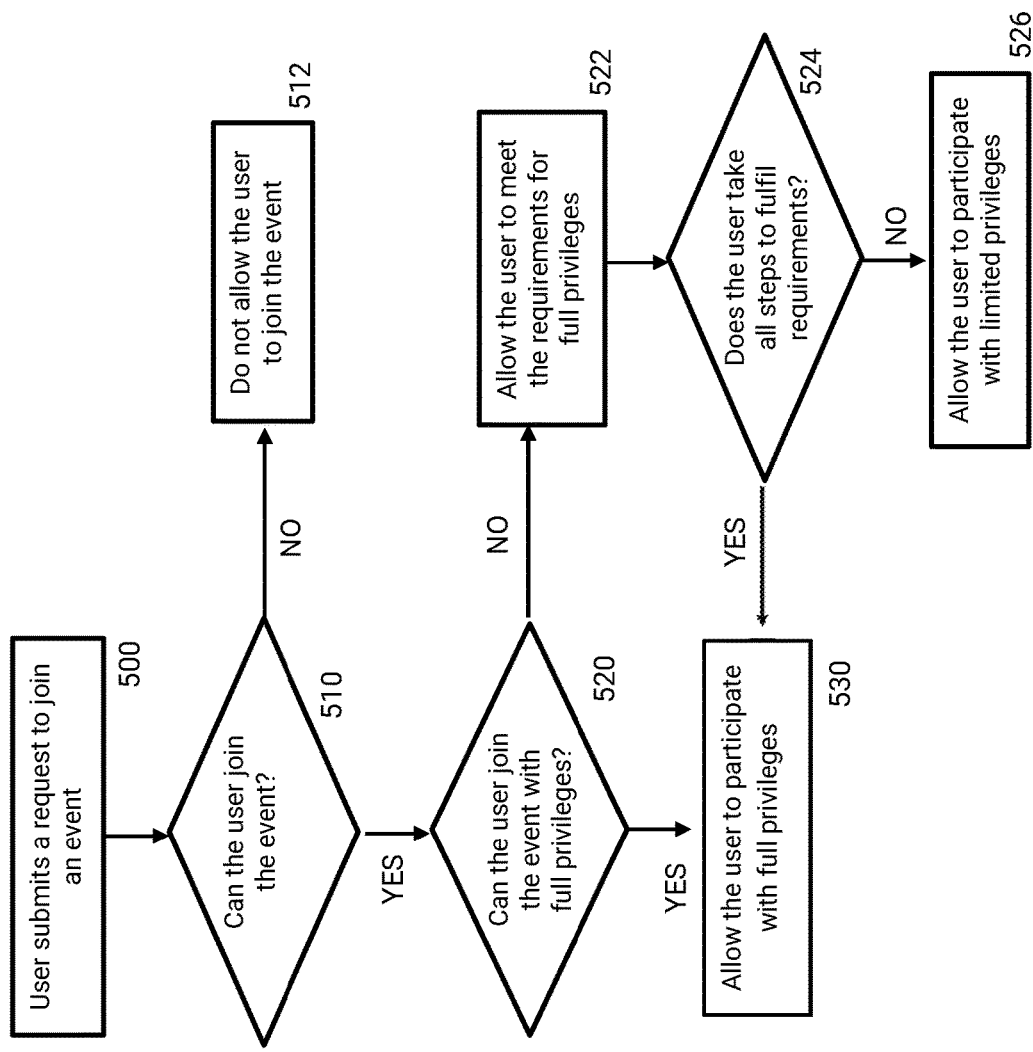
FIG. 5 illustrates the embodiments where a user may be allowed to join a game with full or partial privileges

In one embodiment, all game participants who join a pitch event receive virtual money to play the role of investors. In other embodiments, only those participants who meet one or more requirements receive virtual money for the event. Examples of such requirements include but are not limited to membership period, activity level, performance score, and having their account verified by phone number Those who do not meet the requirements may be offered an opportunity to meet the requirements before joining the event failing which they may still be allowed to join the event but with fewer privileges such as but not limited to not receiving any virtual money or receiving a lesser amount of it, not allowed to message the startups, not allowed to view all or part of information about the event, users, and/or of the results of the event. Consider, for example, a requirement of having one's account associated with an authenticated phone number to receive virtual money. In this example applied to the embodiment illustrated in FIG. 5, when a participant joins an event 500, the system first verifies 510 whether the participant can join the event. For one or more reasons such as the event is not active, the joining code is invalid, or the participant has an inactive account, the participant 512 may not be allowed to join the event. But if the participant can join the event, the system verifies 520 if the participant has an authenticated phone number associated with his or her account. If yes 530, then the participant receives virtual money for that event. If not 522, then the participant is offered an opportunity to provide a phone number and verify the phone number via a method such as OTP authentication whereupon the system verifies 534 whether the phone number is valid and authenticated. If yes, then 530 the participant receives virtual money for the event. If not, then 526 the participant is allowed to join the event but with a lesser amount of or none of the virtual money.

The GSE provides a user interface for game participants to track and manage their portfolio of investments in startups made over the course of time. The interface displays the startup name, the amount invested, date of investment, name of the pitch event if the investment happened at a pitch event, stock ticker symbol if the startup is listed on an exchange, return on investment till date on that stock, number of virtual shares if awarded, updates posted by the startup, news on that startup that may be curated by the system administrator and/or by the community on the GSE. Each piece of information displayed can be a link to further information. For example, the name of the pitch event may be a link which opens up detailed information of that event including but not limited to date, location, startups that participated, startups invested in, RoI on each investment, total RoI of all the investments at that event, and judges/experts at that event.

Game participants who have invested in a particular startup—that is, its investors—may receive updates and notifications from the startup and from the GSE. For example, the startup may post updates about its progress or any news that it may want to share with its investors, whereupon that post will be sent to all its investors. The GSE may also send notifications to the investors including but not limited to when the startup receives a new investment or loses a significant amount of investment, and if the startup receives a warning about being delisted from an exchange. The notifications may be opt-in or opt-out. Game participants who are interested in but haven't yet invested in a startup may add the startup to their watch list whereupon they will receive notifications from the GSE and/or the startup each time there's an update on that startup that is sent out. In one embodiment, a startup cannot know the identity of its individual investors unless those investors have chosen to share their identity with that startup. In other embodiment, the update or an ask that is posted by the startup is sent to its investor-group, and only when the individual investors in that group engage with that post such as by liking it, sharing it, or replying to it, that the startup may be able to identify them as its investors. In another embodiment, the investor information may be openly shared with all users in the GSE.

The gamified startup ecosystem may have a networking module that enables participants to set up online meetings, invite others, and participate in online meetings before or after events. Participants can also use this module to set up offline meets that may display the meetup date, location, organizer, people attending, and other information that may be of interest to the participants.

In some embodiments, startups can post a question on a question board where other game participants can post their replies, which get rewarded based on how they are received by the startups and/or other participants.

The GSE enables the game participants to promote their GSE activities and performances on social media and other websites/platforms, which may draw more attention and participants to the GSE. Among other things, the investors may promote the startups they have invested in, showcase their own success as investors, invite others to join upcoming or in-progress events, and become members of the GSE; the startups may promote their success in the GSE at raising funds, winning awards and prizes, which may draw more attention to their venture, products and services, and help them acquire more fans and potential new users; the startups may also use the functionalities provided by the GSE to invite new users to join the GSE and/or join the upcoming events that the startups may be participating in. The digital certificates, badges, medals that winning investors and startups receive may come enabled to be shared on social media accounts via sharing features. Similarly, upcoming events, results of past events, leaderboards, user profiles and various other aspects of the GSE may be enabled to be shared on social media.

In one embodiment, for an in-person event, the gamified startup ecosystem may use location services to determine the current location of the user if the user has enabled the location services on his or her mobile device, and may allow the user to participate in the event on the GSE only if the user is determined to be at or near the location of the event. Not limited to the location services, the system may also use other means to determine the user's location to make a determination of whether or not to allow the user to join the event on the system. If the user is determined to be not present at or near the location of the event, the user may not be allowed to participate in the event on the system or may be allowed to participate but with fewer privileges. In another embodiment, relevant events are displayed to the user based on the user's location.

One of the utilities of the gamified startup ecosystem is to educate and inform its users about entrepreneurship and investing. In one embodiment, the system provides links to or videos, audios, articles on various topics that may be of use and interest to its users. These content may be made available to some or all in part or full for free or paid by virtual money, real money, or a combination of both. In another embodiment, users can contribute to the educational module of the system by sharing links to or uploading videos, articles, audios that may earn them virtual money and reputation points when they post the content and/or when their content is consumed by other participants. The more their content is consumed, the more they may earn. The virtual money and reputation points they earn can be applied towards other aspects of the GSE as allowed by the rules set by the administrators of the system. In another embodiment, the GSE may offer courses and workshops in entrepreneurship and investment management that may incorporate principles of gamification and may be integrated in part or full with other modules on the GSE.

In one aspect of the invention, game participants can play the role of service providers that include but are not limited to accountants, lawyers, graphic designers, web developers, artists, coders, investment analysts, wealth advisors, recruiters, and coaches. These service providers can connect with and offer their services to startups. Service providers may have their profile pages set up differently than other game participants where they can list the services provided, reviews from their customers, promotional offers, and other information relevant to their services. Startups can pay for their services in part or full from the virtual money raised from game participants who play the role of investors. When paid in part, the balance of the payment for the services received may be paid with real money or other forms of payment approved by the administrator of the GSE and/or the service provider. In this marketplace, startups can rate service providers for the services received, and vice versa. Startups can list the services they are looking for and service providers can place their bids for delivering those services. Startups may choose one or more or none of the bids received. In another embodiment, startups may be obliged to accept at least one of the bids received. The marketplace on the GSE may connect with external marketplaces to import and export the reputations/ratings/reviews of service providers across the GSE and the external marketplaces, the connections provided by either the GSE or the other marketplaces or combination of both, for example, by one or more APIs.

In one embodiment, the gamified startup ecosystem serves as a gamified crowdsourced incubator or an accelerator that allows participants in various roles including but not limited to investors, advisors, mentors, service providers to connect with startups and help them in developing their ideas and ventures in exchange for the following that include but are not limited to bragging rights, medals, badges, reputation points, virtual money or real money, and real or virtual equity in the company. Startups may choose to adopt one or more models, frameworks, programs, or templates provided by the GSE which guide the startups in the following but not limited to choosing a duration of the program, framing their goals, identifying their needs and charting out activities for engaging other participants in the gamified startup ecosystem, and leveraging their engagement to take their ideas, products, projects, and ventures to the next level. These programs may also come with pre-selected participants onboarded in the program as mentors and other roles available in various categories or it may have a list of participants in various categories that the startup can select from. These participants may get rewarded for their contributions to the startups by a plurality of means described at the beginning of this paragraph. In one embodiment, when the startup selects and activates a program, the program runs as per the inbuilt schedule that may include automated reminders to participants, checklists and other functionalities wherein the progress may be monitored, scored, and the scores built into a scorecard. Falling behind the timeline or not completing one or more tasks specified in the program may lead to penalties for the startup that may reflect in the scorecard. In addition to the actual help received in developing the venture, by completing the program the startup may also earn rewards such as certificates, badges, points, and see a boost to their score on the scorecard that they may share with other participants such as investors. Startups may pay for the incubator services by various means including but not limited to virtual money, real money or a combination thereof.

In one embodiment, transactions on the gamified startup ecosystem that include but are not limited to trading of virtual shares, investments in startups at and outside of pitch events, and buy outs of one participants' stakes or investments in startups or Funds by another participant are recorded in a distributed ledger using blockchain technology that can also help settle trades instantaneously while making immutable records of those transactions. In other embodiment, the gamified startup ecosystem allows startups to offer security token offerings and/or initial coin offerings. In another embodiment, the system allows smart contracts between game participants, for example, between startups and service providers wherein when certain parameters have been met, the code will execute the step triggered by those parameters, such as automatically moving an amount of cryptocurrency or virtual money from the startup's wallet to the service provider's wallet when certain criteria are satisfied. As another example, a startup's compliance with the exchange's regulations could be monitored and enforced with a smart contract wherein for example, if the startup fails to hold a quarterly earnings call with its investors, a fine of virtual money or real money could be automatically moved from the startup's wallet to the exchange's. These examples are just to illustrate the application of blockchain in the gamified startup ecosystem and by no means are exhaustive of the various transactions that can be recorded and smart contracts implemented across the various game participants and their activities within the gamified startup ecosystem.

In the gamified startup ecosystem, a wagering system allows game participants to wager on the outcomes of a pitch event. The money may be virtual money, real money, cryptocurrency, or any combination thereof. The wagers may be binary, for example, whether a startup will win or lose, whether or not a certain startup will raise a certain amount of virtual money, or the wagers may be on non-binary outcomes such as what will be the order in which the startups get ranked by audience, or how much virtual money will a specific startup raise. In another embodiment, users can wager on certain outcomes of a startup's journey in the gamified startup ecosystem that extend beyond the outcomes of a pitch event. For example, will the startup make it to IPO on the gamified exchange? How long will it take for the startup to get listed on an exchange? How long will it take for the startup to raise its first fund? In another embodiment, users can wager on the startup achieving specified milestones in the real world. For example, will the startup raise a Series A in the year 2021? Will the startup receive an investment from the VC firm Sequoia in Series B? The wagering system may be integrated within the GSE or it may be external to the GSE but connected to the GSE via a plurality of methods including but not limited to one or more APIs. In another embodiment, the gamified startup ecosystem can interact with other party wagering systems to receive bets and/or betting questions.

In one embodiment, any participant can create one or more betting questions in the gamified startup ecosystem that other participants may bet on. In other embodiments, only those participants qualified by criteria that include but are not limited to age, country of residence, being paid users, performance level, period of membership, activity level, and account privileges may create and/or place bets.

In one embodiment, real investors such as angel investors, partners or employees of VC firms, hedge funds, family-offices, private equity firms and/or those aspiring to be investors may use their performance on the gamified startup ecosystem to showcase their investing acumen and/or to study the various alternative scenarios that could have been possible and their performances therein.

In one embodiment, participants respond to a startup's pitch by selecting one of three options, Green, Orange, or Red, which may be displayed in varying colors, shapes and sizes at one or more positions corresponding to the startup's name. The options may be weighted equally or may be weighted differently, for example, Red=1, Orange=3, Green=9. Results may be determined by the sum of all points received from the participants by the startups for their pitch. For example, if a startup receives 4 Greens, 5 Oranges, 8 Reds, it would have a total score of (4×9)(Green)+(5×3)(Orange)+(8×1)(Red)=59 points. In another embodiment, the winner may be determined by an Olympic medal table method, which is to first sort by the number of total Greens the startups have earned. In the event of a tie in the number of Greens, the number of Oranges will be taken into consideration next, and then the number of Reds. If two or more startups have an identical number of Greens, Oranges, and Reds, their tie may be broken by one or more criteria such as past performance and expert evaluation. The winner among the investor participants may be determined by several methods including but not limited to comparing their evaluations with those of other investor participants or with those of a panel of experts or a combination thereof in that pitch competition. The evaluation options—Green, Orange or Red—may be presented in other terms such as Gold, Silver, and Bronze, thumbs-up/thumbs-down, and may be presented in fewer or greater options such as two or five options.

In one embodiment, the gaming system is used at pitch events in a non-competitive format that may not have winners at the end of the event but it may allow game participants to invest their virtual money in startups pitching at that event, and continue their investment transactions with those startups on a rolling basis outside of and beyond the pitch event and which may carry over on to an exchange on the GSE where it may become part of a new or an ongoing competition. In another embodiment, the GSE is used in part or full by real-world Angel investor groups to assess both the startups pitching at their meetings and the interest levels of their group members in those startups. Analytics and reports from the event help the group decide whether or not they should invest in the startups. Various such investor-groups may provide each other access to the GSE analytics and reports from their meetings to help with syndicating deals in the real-world.

In one embodiment, participants can upload their pitch videos on the GSE and/or they may upload their pitch videos on external hosting services such as YouTube or Vimeo from where the videos can be accessed to be viewed on the GSE. Participants can set their sharing preferences of those videos. In another embodiment, pitch videos may be displayed in one or more feeds that participants can sort by various filters that include but not limited to most popular, most recent, most views, length, geographical location and industry. Participants can also invest in the ideas/ventures presented in the videos using virtual money that may be allocated specifically for the videos in the feed or they may use virtual money they may have received from other sources on the GSE. This feed may have its own rules, prizes and winners distinct from other pitch events in the system and wherein winners may be declared once per contest or at various stages during a series of contests such as daily, weekly, monthly, yearly and so on.

Figure 3:
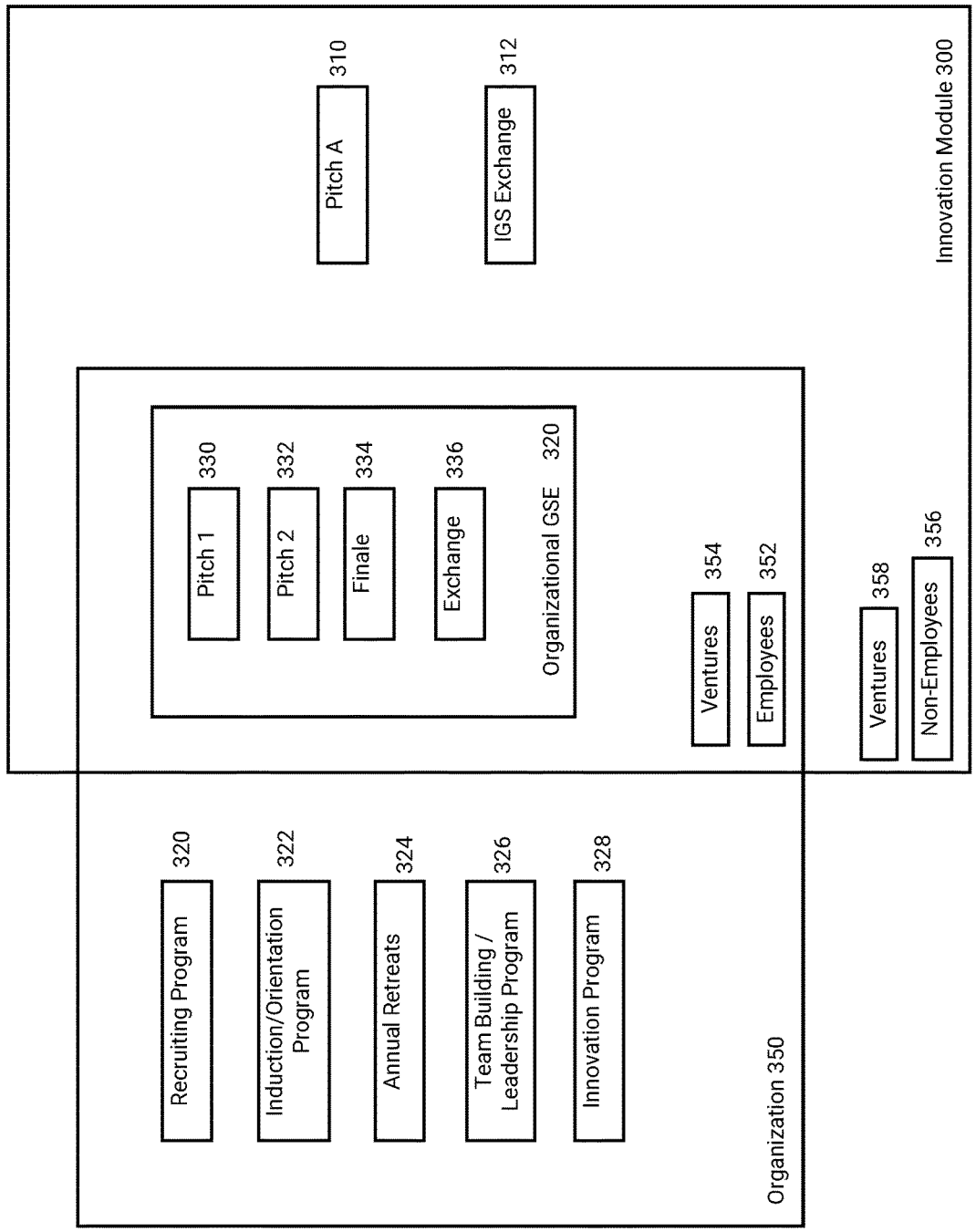
FIG. 3 illustrates an embodiment of an intra-organizational gamified innovation module

In another embodiment, as illustrated in FIG. 3, an organization 350 may use all or part of the GSE as part of its recruiting program 320, induction/orientation program 322, annual retreats 324, team-building, creativity and leadership programs 326, and/or as a part of an ongoing innovation program 328. The organization may use the GSE to evaluate ideas from within 354 or outside 358 the organization in a game-like environment wherein the ideas are pitched as 'ventures', the presenters or the idea-owners playing the role of startup founders/CEOs, and other employee 352 or non-employees 356 game participants or a combination of the two playing the role of investors. The startup leaderboard helps to recognize ventures that receive the most funds, and the investor leaderboard helps to recognize those participants who correctly identify the ventures deemed most investable by the investors. The organization 350 may reward the winning ventures with real cash awards or gifts, or virtual in-game rewards, or certificates, badges, trophies, or real money to the ventures to develop their ideas to the next level. The organizations may reward the winning investors with real money or gifts, or certificates, badges, trophies, and/or a role to play in the ventures. In some embodiments, the organization may have the ventures pitch one or more times 330, 332 to select the ones that will proceed to the next stage, whereupon the finalists may pitch at a finale 334 such as an annual retreat to decide the ultimate winner of the competition. In other embodiment, after the first round of pitching, the ventures will be open to receiving investments on an ongoing basis and the final leaderboards determined at a set point in the future. In another embodiment, the investors can move their initial investments from one venture to another and can make changes to their investments till the final deadline. In another embodiment, investors receive virtual shares in ventures in return for their investments. The ventures are listed on an exchange 336 in the gamified startup ecosystem and the investors can trade their shares on that exchange till the final deadline. When the event ends, the ventures are ranked as per the most funds raised or their market capitalization or share price, and the investors are ranked as per their return on their investments or their portfolio value. In other embodiments, the organization may seek external validation of internal projects in which case the internal ventures 354 may be pitched at external pitch events 310 or listed on one or more external exchanges 312. Employees 352 of the organization may also participate in external pitch events 310, trade virtual shares of internal ventures 354 or of external ventures 358 on external exchange 312 which helps them build their reputation and skills as investors which they can then use to showcase their investing acumen, their ability to predict success or failure, and their ability to recognize investable ideas which, in turn, may be recognized by their organization. Investors with higher scores and reputation in the GSE may receive more privileges and higher weights for their investments in their role as experts within the GSE and/or the organization.

In another embodiment, the gamified startup ecosystem serves as a means for focus group and market research where the participants of the focus group and market research evaluate various ideas, pitches, products, and ventures in a manner similar to those at pitch events receiving virtual money and playing the role of mock investors in those ideas and ventures. The participants of focus groups and research may be selected randomly or by selecting them from the GSE on specific criteria relevant to the ideas and ventures being evaluated. The selected participants may be rewarded by various means including but not limited to virtual money or real money or a combination thereof, and reputation points.

The GSE may certify events that meet its certification criteria that include but are not limited to the number of startups pitching, the number of investors at the event, the amount of virtual money allowed per participant, duration of the event, whether hosted from a free or a paid account, reputation of the event organizer, and the theme of the event. In one embodiment, performance and activities of game participants at only certified events may count towards their overall performance earning them rewards and penalties in the GSE. Events that do not meet the criteria may be marked as uncertified events and may receive none or fewer privileges than certified events. An event marked previously as certified may be later marked as uncertified or vice versa at the discretion of the administrator of the GSE or if the GSE receives information about an event that warrants the change.

The GSE may enable game participants to collaborate and compete as teams and Funds at pitch events that are adapted for the group format. In the group format, the individual game participants can pool their portfolios as well as their virtual money accounts. The group format of the pitch event may have the same basic format as that of the individual pitch event format—such as joining the event, investing the virtual money in the participating startups, rating the pitches, and leaderboards for top startups and investors—but may differ in terms of requirements needed to be met for a group/team/Fund to participate, requirements that include but are not limited to a limit of how much a group can invest, duration of the event, privileges and past performances of the game participants, and participation fees. The competition in a group format can also occur as an ongoing event with virtual shares of startups traded on one or more exchanges within the GSE. The profits or losses from a team effort may be distributed among the team members in a plurality of methods including but not limited to the proportion of their funds invested in the pooled funds and peer-evaluation.

In one embodiment, at pitch events, game participants can buy and sell virtual shares in the startups pitching at the event as the event progresses. The event may start with all startups having the same share price or the share prices of the share prices may vary if the event allows the previous performances of the startups to be included in determining the share prices. Trading of the virtual shares may happen similar to that of a stock market. When the event ends, Startup Leaderboard ranks startups based on their market capitalization or share price that may include or be restricted to the event. Investor Leaderboard ranks startups based on the returns on their investments from their trades over the event.

In one embodiment, virtual shares in startups may be available for immediate trading when the event starts. In another embodiment, shares of a startup are available for trading only when the startup starts pitching. In another embodiment, shares of a particular startup are available for purchase only after the startup has finished pitching. In one embodiment, game participants receive virtual shares of startups that they invest in and which are allowed to offer virtual shares to the public when the startups meet certain criteria such as getting listed on an exchange. These game participants can then start trading these virtual shares on pre-exchange. They may decide to sell their virtual shares later, either to take some profit or stop a loss. Or, they can hold onto their shares until a closing event occurs.

In one embodiment, the flow of investments in and out of startups at pitch events is displayed in realtime in various formats including but not limited to texts and charts. This information may be available to all the participants at that event or only to those participants who meet the specific requirements set by the event host or the administrator of the GSE.

The GSE tracks the virtual money investments in each startup, the equity ownership of all the game participants who have invested in each startup, all the company's virtual securities such as common shares, preferred shares, warrants, who owns them, date/time of the transactions, and the prices paid by the game participants for these securities. It tracks game participants' percentage of ownership in the company, and the value of their securities, and dilution over time. In one embodiment, the system enables a startup to model and to analyze events such as ownership dilution, issuing employee stock options, or issuing new securities. This tracking may be carried out in a capitalization table (or cap table) module. The cap table shows the total market value of a startup and its components and is updated each time there is an investment in a startup in the gamified startup ecosystem. In another embodiment, blockchain is used to record transactions on the gamified startup ecosystem and track the cap table to keep immutable records; it may also have an option to convert the cap table into a token; and updating ownership records may occur in the blockchain-based cap tables when trades are settled via smart contracts. The cap table may be updated with each additional round of funding or events including but not limited to issuing new virtual shares, increasing or decreasing stock options for employees, the exit of key shareholders, transfer of pre-shares to another existing shareholder or new shareholder, and termination and retirement of employees who may be holding options or preshares.

Over the life and journey of startups in the gamified startup ecosystem, there may be different events internal and external to the GSE that may be relevant (directly or indirectly) to real investors' perceptions and evaluations of the startups. The GSE tracks the activity in and of startups on the system comprising their performance at various pitch events; the total virtual raised by the startups across events, over a period of time, and outside of pitch events; engagement of game participants with the startups and vice-versa; collects data from the events and activities thus tracked, analyzes the data and displays the analysis and insights thereof in various formats on its Startup Scorecard module.

In one embodiment, the system takes as input the data collected and calculates scores for the startups on various dimensions including but not limited to an attention score that conveys to various stakeholders how worthy the startup is of their attention, a popularity score for how popular the startup is in the GSE, and a hunger score for how hungry and scrappy the startup is for success. These scores along with additional data may be used to compute a consolidated score for the startup. Using data on a plurality of metrics collected on user activity within the GSE, the system may determine a valuation of the startup which may be used for ranking startups relative to each other as well as for calculating their percentile scores. The said data may be used in another embodiment to provide an estimated probability of success of a startup to achieve specified milestones from an investment growth point of view. In another embodiment, startups may be recommended to participants according to a recommendation engine, such as an artificial intelligence (AI) recommendation engine that may take various criteria into account including but not limited to the criteria the participants specify, their risk appetite, and their profile. In another embodiment, the system may also include data external to the system such as from including but not limited to internet, websites, institutions, and social media, In some embodiments, any participant can search for startups and access their Startup Scorecards. In other embodiments, only certain participants who meet specified criteria that include but are not limited to being verified investors, paid users, and being authorized by the startups to access their reports can access the reports. In other embodiments, investors can only submit a request to the startup to access its reports whereupon the request is sent to the startup. Upon the startup's authorization, the investor may be notified that the access has been granted or the requested report may be mailed to the investor.

The GSE may track activities of all its game participants and collect data on the quantity and quality of their activities, contributions in the system, and determine a score that conveys how important or valuable a resource that user is to one or more communities within the system. This score may also be used to determine the weights that a participant may receive for his or her investments, and special privileges accorded to participants for varying categories of scores. The participants may also receive percentile scores for their performances and activities.

In another embodiment, at pitch events, participants can rank order the pitching participants. The winning pitches may be determined by several methods including but not limited to first calculating the total points for each startup where the rank directly corresponds with the points (for example, a rank of 4 equals 4 points) or use a multiplier, which may then be followed by arranging the total points accrued by each participant in an ascending order with the winner on the top having the least number of points followed by the participant with the second least number of points and so on. The winning investors may be determined by several methods including but not limited to comparing the participant's rankings with all or some of the tallied rankings of startups or identifying the ranked order that came closest to matching the tallied rankings of startups or by identifying the participants who got a specific number of ranks identical to that of the final tallied ranks prepared from all participants' rankings.

Pitch events using the GSE serve as a fundraising venue for startups to raise virtual funds in the gamified startup ecosystem Once a startup meets certain requirements of the GSE including but not limited to the number of pitch events it has participated in, the amount of virtual funds it has raised, number of investors it has acquired, number and category of one or more Funds it has acquired as its investor, and/or requirements external to the gamified startup ecosystem including but not limited to real money it has raised, its status as a legal entity such as whether or not it is an incorporated entity, whether or not it is revenue generating, has a real product or service in the market, and has a minimum number of real users, the startup can then apply to be listed on an exchange within the GSE. Getting listed on the exchange may provide the startup with enhanced credibility within the gamified startup ecosystem, and may allow the startup to raise more funding by making it easier for investors to buy its virtual shares outside the context of a pitch event and at their convenience. Getting listed on an exchange may also allow the startup to provide liquidity to its investors who had invested in the startup at pitch events and may have been holding the shares they had acquired over a period of time. Once the startup is listed on the exchange, those investors may now be able to sell their shares to other game participants or back to the company or to other Funds which will return to them their virtual money minus or plus the profit or loss. Participants can then use this virtual money to carry out various activities on the GSE or invest in other startups Selling the virtual shares will also enable those investors to realize and hold on to their gains that may help them maintain their scores and rankings on various investor leaderboards such as world rankings, daily/weekly/monthly/quarterly/yearly leaderboards, realized/unrealized gains leaderboard, and others.

The GSE may receive an input from a startup in the form of a request, an interest, or an application to get listed on an exchange, or one or more of other entities such as a Fund may nominate a startup to be listed on an exchange, or at least one of the administrator of the GSE may extend a listing invite to the startup. In one embodiment, the startup gets listed on the exchange without needing an approval or a manual review of its application. In another embodiment, the startup's application is reviewed. If the startup is approved and agrees to comply with the listing criteria, a date is set for the startup's getting listed on the exchange. The date is determined using several factors which include but are not limited to the startup's preference for a date, and the availability of that date on the exchange. Once the date is set, the date may be displayed on the exchange for the public to view or it may be made available as a restricted content for certain members.

The startup may get approved to be listed on the exchange in various formats including but not limited to initial public offering, initial coin offering, security token offering, direct listing, via a SPAC, and primary direct listing. Once the startup is listed on the exchange, users can start trading its virtual shares. The startups listed on the exchange will be monitored by a monitoring module to ensure they are in compliance with the regulations of the exchange they are listed on within the GSE. The monitoring module may use feedback from participants to report a startup's perceived violations and reward the participants with virtual money or other in-game credits for the reported violations acknowledged by the administrators of the system. The monitoring module may have one or more administrators of the GSE and volunteer participants dedicated to the task of monitoring. The system may also have in-built mechanisms to detect violations such as a quarterly or annual report not filed by the deadline. The startup that is determined to have violated one or more regulations may receive a warning and may be given an opportunity to address those violations with or without a fine, and upon failing to address the violation within the grace period may be delisted from the exchange. At each stage of warning and delisting, other game participants who may be investors in these startups and/or those who may have added this startup on their watchlist may receive alerts informing them about the startup's status on the exchange. In one embodiment, the monitoring module may use blockchain technology and/or smart contracts to record violations and enforce the penalties associated with the violations.

The exchange may be one universal exchange within the gamified startup ecosystem or it may have several sub-exchanges operating by a plurality of same or different operators. For example, one organization using the gamified startup ecosystem may opt to have its own exchange insulated from the other activities within the larger gamified startup ecosystem.

The gamified startup ecosystem allows participants to associate their account with both virtual money and real money including real-world cryptocurrency. Optionally, the user account may be associated with real-world money by allowing a user to deposit real-world monetary funds into the user account (e.g., via credit card payment, debit card payment, wire transfer, payment from an online wallet or an electronic wallet, by utilizing crypto-currency such as Bit-Coin, or the like). Optionally, the user account may allow the user to convert a credit balance that the user may have with the system into real-world money (or prizes, or assets, or rewards, or crypto-currency), which may be withdrawn by the user or may otherwise be received or obtained by the user, or which may be otherwise utilized or transferred by the user to third parties Optionally, the system may allow the user to pay money, or to receive money, via one or more electronic means or payment systems such as, for example, Apple Pay, or Google Pay, or PayPal, or other suitable means. Although the gamified startup ecosystem may run on virtual money and virtual shares, users may be able to use real money including cryptocurrency to buy virtual money, and convert virtual money into real money including cryptocurrency when certain conditions may be met. Also, some actions of users may win them real money. In one embodiment, game participants may win real money as cash prizes or gift cards or other prizes that have real monetary value. In another embodiment, the investors in a startup on GSE may be able to become real investors in that startup.

In the GSE, participants who may not have attended a pitch event may be offered other opportunities to invest in one or more startups that had pitched at that event if those startups satisfy the criteria to receive such kinds of investments from participants and/or if the participants satisfy the criteria to invest in such kinds of startups.

In the gamified startup ecosystem, there may be several games or events of various types running concurrently. In some cases, activities and results of one game may not affect those of another game whereas in some other cases, some or all activities and results of one or more games may affect all or part of one or other games. For example, some embodiments are explained using FIG. 1. At a pitch event 110, startups may be competing to be the winners and investors may be competing to be the top investors. A similar thing may be happening at another pitch event 112 that may not have any of the participants from pitch event 110, whereas at another pitch event 114, one or more participants in one or more roles at 114 may also be participating at pitch event 112. In one embodiment, results of 112 may not affect the results of 114. In another embodiment, results of 112 may indirectly affect results or activities of 114. As an example, a game participant in 112 wins the top investor in 112 whereby the participant's world ranking may change and also the weightage it may receive for future events, in which case, the investments and ratings of this participant may suddenly receive a higher weightage in the event 114, thereby indirectly affecting the results of 114. In another embodiment, a startup may be participating in pitch event 112 and may also be participating in an ongoing event 116 on an exchange. In this embodiment, how the startup performs at the event 112 may affect its share price on the exchange and thereby affect its results in the event 116. In another embodiment, a startup's performance on the exchange 116 may affect how participants can engage with it in the event 112 in various ways, for example, the participants may or may not be able to trade its virtual shares at the event 112 or the participants' investments in the startup at 112 may not carry over to the event 116. Also, several various games may have one or more underlying game-mechanics common to them such as that of their participants earning virtual money by various activities such as rating startups' pitches at events which the participant may be able to invest in startups at that event or other events. Also, in one embodiment, virtual money received at one pitch event may be available for immediate use at other events. In another embodiment, a meta-game 100 may be overarching all games and activities of participants on the gamified startup ecosystem that may take into account all actions and results on the GSE that are deemed valid by the administrators of the system and which may contribute to their ongoing individual scores, which in turn may affect their privileges and activities on the system. Participants may play a different role in one game than in another game happening at the same time or later. For example, a participant playing the role of startup at event 110 may be playing the role of an investor at event 114 and may be playing the role of a host at event 112 and the role of a Fund at event 116.

In another embodiment, activities and results of two events 122 and 124 may not affect each other but may affect that of another event 120. An example of this may be two intra-college pitch competitions 122, 124 that select their teams at these competitions and which then go on to compete at an inter-collegiate pitch competition 120.

These embodiments of various game types are not exhaustive but only illustrative of the various forms of games within the gamified startup ecosystem. Unless otherwise specified, any embodiment described in this disclosure may be applicable to any form of the game described herein or that can occur within the gamified startup ecosystem.

Database has several meanings in this invention. Database can refer to the backend data store a software developer uses when building an application. It refers to different types of databases including but not limited to RDBMS and NoSql. It can also refer to applications that can be configured to run as if they were a database such as Google Spreadsheet that can be used to read and write data with an API that renders google sheets as if it were a database.

The invention claimed is:

1. An investment system, the system comprising:
   a plurality of game participant devices comprising computers or mobile devices; and
   a server comprising a processor and a non-transitory computer-readable medium where the non-transitory computer-readable medium comprises processor steps that when executed by the processor perform a method for an investment game, the method comprising:
   retrieving data, via the processor, associated with a plurality of game participants from a database where the data was collected via the server, stored in a database and processed by the server;
   in a case that an investment fund is based on a function of performance, assigning, via the processor, an allotment of virtual money to a plurality of game participants from the investment fund of virtual money wherein assigning is based on the retrieved performance data associated with each of the plurality of game participants performance in previous games;
   in a case that the investment fund of virtual money is reset for all of the plurality of game participants, assigning, via the processor, a same allotment of virtual money to a plurality of game participants from the investment fund of virtual money;
   in response to a pitch from one of the plurality of game participants on one or more game participant devices, receiving, from the one or more of the plurality of game participant devices, one or more simulated investment amounts at the training server;
   storing, via the processor, the one or more simulated investment amounts received at the server in a database;
   determining, via the processor, a first winner based on (i) totaling, for each participant, the one or more simulated investment amounts received from the plurality of participants that is stored in the database and (ii) determining which participant received the greatest simulated investment amount, wherein the first winner is a startup;
   determining, via the processor, a second winner based on a return on investment where (i) a return on investment is calculated for the plurality of participants that transmit one or more simulated investment amounts to the server and (ii) the return on investment is based on the one or more simulated investment amounts made by one or more participants over a period of time, wherein the second winner is an investor; and
   transmitting, via the server, the determination of the first winner or the second winner to the plurality of game participant devices.

2. The investment teaching system of claim 1, wherein the method further comprises:
   displaying the first winner and the second winner on the plurality of game participant devices.

3. The investment game system of claim 2, wherein the performance and activities of game participants in a plurality of roles are tracked and analyzed over a period of time to determine their scores on a plurality of dimensions, the said scores provided in scorecards to game participants for their various roles within the investment game system such that the game participants may share the scorecards with one or more of other game participants or authorize one or more of other game participants to access the scorecards for free or for a payment that may be made in part or full with virtual money, fiat currency, cryptocurrency, crypto tokens, or a combination thereof.

4. The investment system of claim 1, wherein the virtual money is determined by a plurality of factors comprising the user's performance associated with previous games, a level of the user's activity and engagement within the game system, and whether the user has verified the account as per the requirements of the investment game system.

5. The investment game system of claim 1, wherein the virtual money received by a game participant is available to the game participant for carrying out activities within the investment game system for investing in other game participants in a plurality of roles, accessing premium features and content within the game system, investing in funds and in other game participants that are playing the role of startups, rewarding other game participants, and as a medium of exchange for services received from other game participants.

6. The investment game system of claim 1, wherein a game participant acquires virtual money by purchasing it with real money from the investment game system or from other game participants, completing surveys for different game participants, promoting other game participants' activities and performances, watching videos and reading articles posted on the investment game system, and reaching milestones specified by the game system.

7. The investment game system of claim 1, wherein a game participant redeems the virtual money for real money, credits, tokens, or other items made available within the game system.

8. The investment game system of claim 1, wherein the virtual amount invested by a first game participant in a second game participant is acquired by a third game participant with or without the consent of the second participant for an amount that may be the same as or different than the amount invested by the first participant.

9. The investment game system of claim 1, wherein the first game participant investing a virtual amount in the second game participant in a plurality of roles receives a stake in one or more of the second game participant's roles giving the first participant proportionate voting rights in the second participant's role.

10. The investment game system of claim 9, wherein the stake acquired by a first game participant in a second game participant is acquired by a third game participant with or without the consent of the second participant for a consideration that may be the same as or different than the amount invested by the first participant.

11. The investment game system of claim 1, wherein the virtual investments in startups occur over a period of time, one or more winners are determined at different stages over that period of time, the stages marked by at least one of time interval, number of game participants, total funds raised or invested by one or more participants, period of inactivity, or other criteria set by the game system.

12. The investment game system of claim 11, wherein the game continues over a period of time with one or more participants joining the game in the role of startups or participants or Funds after the game has begun or wherein one or more game participants may drop out before the game ends.

13. The investment game system of claim 1, wherein a participant's return on investment in a startup is determined by at least one of the following: performance of the said startup in raising the amount of virtual money from other game participants, the amount of virtual money invested by the said participant in that startup, and how closely the participant's investments aligned with that of all the game participants' collective investments in that game how closely the participant's investments aligned with a selected group of participants.

14. The investment game system of claim 1, wherein game participants switch between one role to another role available to them on the investment game system.

15. A computer implemented method performed by a processor to for teaching about investing using an investment game, the method comprising:
retrieving data, via the processor, associated with a plurality of game participants from a database where the data was collected via the server, stored in a database and processed by the server;
in a case that an investment fund is based on a function of performance, assigning, via the processor, an allotment of virtual money to a plurality of game participants from the investment fund of virtual money wherein assigning is based on the retrieved performance data associated with each of the plurality of game participants performance in previous games;
in a case that the investment fund of virtual money is reset for all of the plurality of game participants, assigning, via the processor, a same allotment of virtual money to a plurality of game participants from the investment fund of virtual money;
in response to a pitch from one of the plurality of game participants on one or more game participant devices, receiving, from the one or more of the plurality of game participant devices, one or more simulated investment amounts at the server;
storing, via the processor, the one or more simulated investment amounts received at the server in a database;
determining, via the processor, a first winner based on (i) totaling, for each participant, the one or more simulated investment amounts received from the plurality of participants that is stored in the database and (ii) determining which participant received the greatest simulated investment amount, wherein the first winner is a startup;
determining, via the processor, a second winner based on a return on investment where (i) a return on investment is calculated for the plurality of participants that transmit one or more simulated investment amounts to the server and (ii) the return on investment is based on the one or more simulated investment amounts made by one or more participants over a period of time, wherein the second winner is an investor; and
transmitting, via the server, the determination of the first winner or the second winner to the plurality of game participant devices.

16. The method of claim 15, wherein the method further comprises:
displaying the first winner and the second winner on the plurality of game participant devices.

17. A non-transitory computer-readable medium comprising processor steps that when executed by a processor perform a method for teaching about investing using an investment game, the method comprising:
retrieving data, via the processor, associated with a plurality of game participants from a database where the data was collected via the server, stored in a database and processed by the server;
in a case that an investment fund is based on a function of performance, assigning, via the processor, an allotment of virtual money to a plurality of game participants from the investment fund of virtual money wherein assigning is based on the retrieved performance data associated with each of the plurality of game participants performance in previous games;
in a case that the investment fund of virtual money is reset for all of the plurality of game participants, assigning, via the processor, a same allotment of virtual money to a plurality of game participants from the investment fund of virtual money;
in response to a pitch from one of the plurality of game participants on one or more game participant devices, receiving, from the one or more of the plurality of game participant devices, one or more simulated investment amounts at the server;
storing, via the processor, the one or more simulated investment amounts received at the server in a database;
determining, via the processor, a first winner based on (i) totaling, for each participant, the one or more simulated investment amounts received from the plurality of participants that is stored in the database and (ii) determining which participant received the greatest simulated investment amount, wherein the first winner is a startup;
determining, via the processor, a second winner based on a return on investment where (i) a return on investment is calculated for the plurality of participants that transmit one or more simulated investment amounts to the server and (ii) the return on investment is based on the one or more simulated investment amounts made by one or more participants over a period of time, wherein the second winner is an investor; and transmitting, via the server, the determination of the first winner or the second winner to the plurality of game participant devices.

18. The medium of claim 17, wherein the method further comprises:

displaying the first winner and the second winner on the plurality of game participant devices.

\* \* \* \* \*